United States Patent
Gupta et al.

(10) Patent No.: US 11,086,889 B2
(45) Date of Patent: Aug. 10, 2021

(54) CONTENT-AWARE TUTORIAL RECOMMENDATION

(71) Applicant: Adobe Inc., San Jose, CA (US)

(72) Inventors: Subham Gupta, Roorkee (IN); Arnab Sil, Khalisani (IN); Anuradha, Bengaluru (IN)

(73) Assignee: Adobe Inc., San Jose, CA (US)

( * ) Notice: Subject to any disclaimer, the term of this patent is extended or adjusted under 35 U.S.C. 154(b) by 115 days.

(21) Appl. No.: 16/585,159

(22) Filed: Sep. 27, 2019

(65) Prior Publication Data
US 2021/0097084 A1   Apr. 1, 2021

(51) Int. Cl.
| | |
|---|---|
| G06F 16/2457 | (2019.01) |
| G06K 9/62 | (2006.01) |
| G06T 7/00 | (2017.01) |
| G06N 3/04 | (2006.01) |
| G06N 3/08 | (2006.01) |

(52) U.S. Cl.
CPC ..... *G06F 16/24578* (2019.01); *G06K 9/6201* (2013.01); *G06K 9/6256* (2013.01); *G06N 3/0427* (2013.01); *G06N 3/0454* (2013.01); *G06N 3/08* (2013.01); *G06T 7/0002* (2013.01); *G06T 2207/10016* (2013.01); *G06T 2207/20081* (2013.01); *G06T 2207/20084* (2013.01); *G06T 2207/30168* (2013.01)

(58) Field of Classification Search
CPC ........... G06F 16/24578; G06K 9/6201; G06K 9/6256; G06N 3/0427; G06N 3/0454; G06N 3/08; G06T 7/0002; G06T 2207/10016; G06T 2207/20081; G06T 2207/20084; G06T 2207/30168
USPC ....................................................... 382/157
See application file for complete search history.

(56) References Cited

U.S. PATENT DOCUMENTS

| | | | |
|---|---|---|---|
| 8,370,282 B1 * | 2/2013 | Leung | G06F 16/583 706/20 |
| 10,628,185 B1 * | 4/2020 | Gupta | G06F 3/0481 |
| 2009/0281975 A1 * | 11/2009 | Atallah | G06N 3/02 706/18 |

(Continued)

*Primary Examiner* — Nancy Bitar
*Assistant Examiner* — Daniella M. DiGuglielmo
(74) *Attorney, Agent, or Firm* — Finch & Maloney PLLC

(57) ABSTRACT

Techniques are disclosed for generating tutorial recommendations to users of image editing applications, based on image content. A methodology implementing the techniques according to an embodiment includes using neural networks configured to determine subject matter of a user provided image and to identify objects in the image. The method also includes selecting one or more proposed tutorials from a database of tutorials. The database is indexed by tutorial subject matter and tutorial object content, and the selection is based on a matching of the determined subject matter to the tutorial subject matter and a matching of the identified objects to the tutorial object content. The method further includes calculating an effectiveness score associated with each of the proposed tutorials, the effectiveness score based on application of the proposed tutorial to the image. The method further includes sorting the proposed tutorials for recommendation to the user based on the effectiveness scores.

20 Claims, 11 Drawing Sheets
(2 of 11 Drawing Sheet(s) Filed in Color)

(56) References Cited

U.S. PATENT DOCUMENTS

| | | | |
|---|---|---|---|
| 2011/0075917 A1* | 3/2011 | Cerosaletti | G06T 7/0002 |
| | | | 382/159 |
| 2017/0294010 A1* | 10/2017 | Shen | G06T 7/0002 |
| 2019/0251446 A1* | 8/2019 | Fang | G06N 3/084 |
| 2019/0258498 A1* | 8/2019 | Chandan | G06F 40/20 |

* cited by examiner

Context-Aware Tutorial
Recommendation System
150

User provided image
130

↓

Subject matter determination neural network
(compute subject matter of image)
220

↓

Object identification neural network
(compute object tags associated with image)
230

↓

Tutorial selection module
(filter tutorials based on subject matter and object tags)
240

↓ Proposed Tutorials 250

Effectiveness score calculation module
(compute effectiveness score for each proposed tutorial)
260

↓

Sorting module
(Sort proposed tutorials based on effectiveness score)
270

↓

Heuristic filtering module
280

↓

Presentation module
(Present resulting tutorials to user)
290

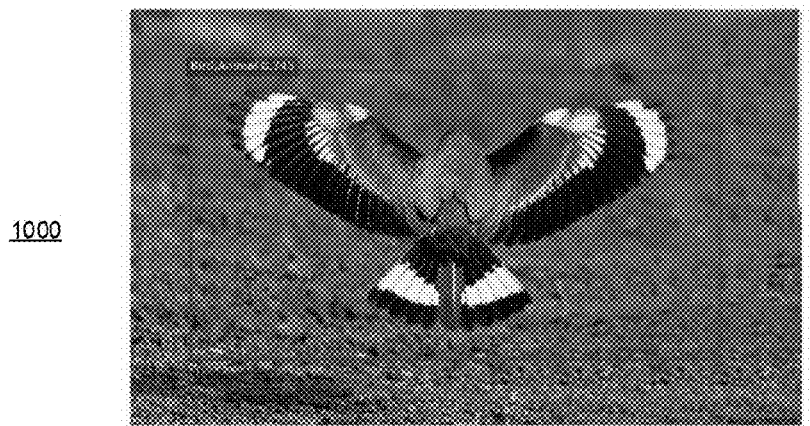
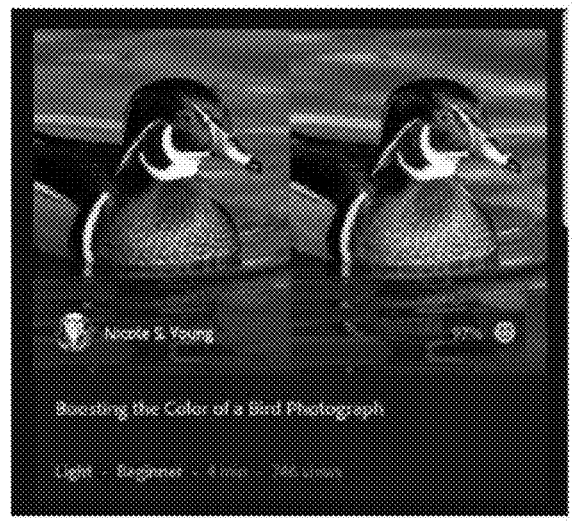
FIG. 10

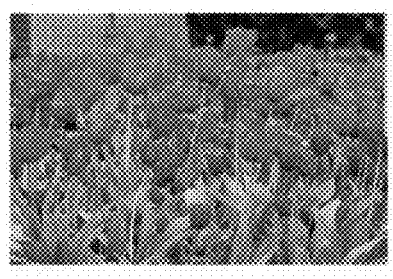
Input Image
1100
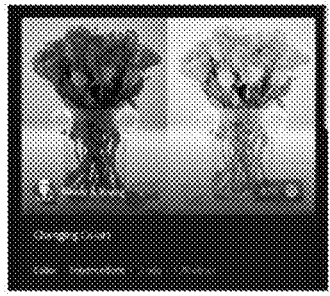
Recommended Tutorial
1110
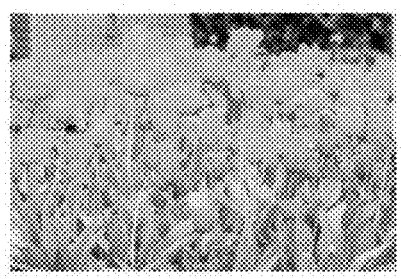
Output Image after applying tutorial
1120
Input Image
1130
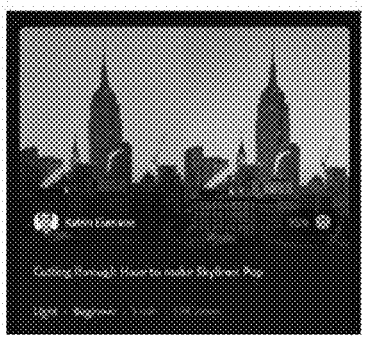
Recommended Tutorial
1140
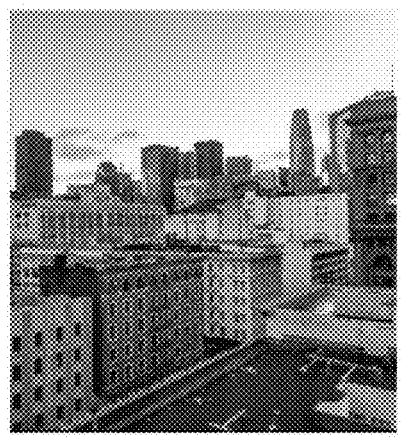
Output Image after applying tutorial
1150
FIG. 11

US 11,086,889 B2

CONTENT-AWARE TUTORIAL RECOMMENDATION

FIELD OF THE DISCLOSURE

This disclosure relates to providing tutorial recommendations. Particularly, this disclosure relates to techniques for providing tutorial recommendations to users of image editing applications, based on image content.

BACKGROUND

Many photo editing applications include a large set of complex tools that provide powerful image editing and manipulation capabilities. Because of the large number of tools and the fact that they can be difficult to master, tutorials are often included with these applications to provide guidance and assist the user in the use of these tools.

SUMMARY

Introduced here are techniques for providing content-aware tutorial recommendations to the user of a photo editing application, based on the content of the user's photo. A methodology is provided that recognizes the subject matter of the user's photo (e.g., portrait, wildlife, food, architecture, etc.), identifies objects in the photo (e.g., a tiger, a skyscraper, a dish of pasta, etc.), and then provides tutorial recommendations to the user based on that subject matter and identified objects. The recommended tutorials are selected to have similar subject matter and include similar objects. In some embodiments, tutorials are proposed for recommendation further based on estimated aesthetic improvements obtained from application of the techniques presented in the proposed tutorials, to the user photo of interest. The estimated improvements provide some additional measure of the value of the proposed recommendation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 is a block diagram of a context-aware tutorial recommendation system, configured in accordance with an embodiment of the present disclosure.

FIG. 10 illustrates examples of subject matter, object, tutorial images, and aesthetic improvements, in accordance with an embodiment of the present disclosure.

FIG. 11 illustrates examples of image improvements based on application of recommended tutorials, in accordance with an embodiment of the present disclosure.

DETAILED DESCRIPTION

As noted previously, photo editing applications typically include a large set of complex tools that provide powerful image editing and manipulation capabilities to enable the user to produce better photographs. These tools, however, can be difficult to master, especially for the non-professional user, and therefore tutorials are often included with these applications to provide guidance and assist the user in the selection and use of the tools. Many users, however, fail to take advantage of these tutorials. One possible reason for this underutilization is that it can be difficult to find the tutorial that is best suited for the photo in question, from among the hundreds or thousands of tutorials that may be available. To this end, it would be desirable to have techniques for providing content-aware tutorial recommendations to the user, based on the subject matter of the user's photo as well as the objects in the photo.

Thus, according to an embodiment of the present disclosure, a methodology is provided that recognizes the subject matter of the user's photo (e.g., portrait, wildlife, food, architecture, etc.), and also identifies objects in the photo (e.g., a tiger, a skyscraper, a dish of pasta, etc.), and then provides tutorial recommendations to the user based on that subject matter and identified objects. In some embodiments, tutorials are proposed for recommendation based on estimated aesthetic improvements obtained from application of the techniques presented in the proposed tutorials, to the user photo of interest, to provide some measure of the value of the proposed recommendation, as will be described in greater detail below.

Figure 1:
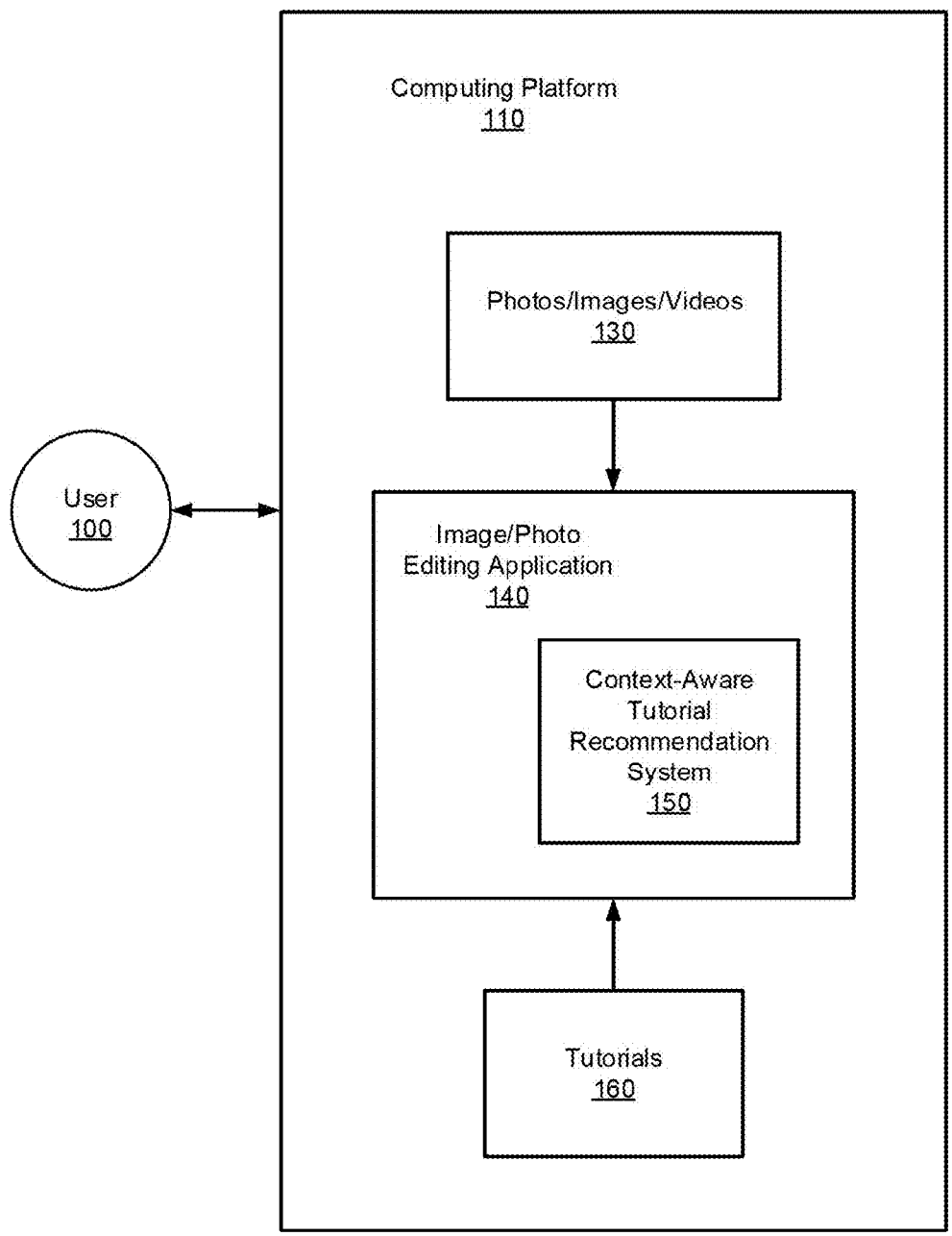
FIG. 1 illustrates an application of a context-aware tutorial recommendation system, configured in accordance with an embodiment of the present disclosure.

FIG. 1 illustrates, at a high level, a context-aware tutorial recommendation system 150 employed in an image/photo editing application 140 on a computing platform 110, configured in accordance with an embodiment of the present disclosure. A user 100 can interact with the computing platform 110 and with the image/photo editing application 140 that is hosted on the platform (e.g., executed by processors associated with the platform). Photographs, images, and/or videos 130 may be provided to the photo editing application 140, either directly by the user, from a database or other form of storage, over the internet, or by any other suitable means, although the term "user provided image" may be used herein for simplicity.

The photo editing application 140 is configured to allow the user to view, organize, manipulate, and modify the images 130. The photo editing application 140 generally provides a toolset that includes a comprehensive collection of tools, of varying levels of complexity. Examples of tools include filters, color adjustments, brightness/contrast adjustments, distortion effects, sharpening effects, layering of images, merging of images, editing pixels or regions of images, cut and paste operations, cropping, stretching, image stitching, and blending operations, to name just a few.

Some photo editing applications include hundreds, or even thousands, of such tools and it can be difficult for the user to be familiar with, let alone master, the majority of these tools. For this reason, tutorials 160 are provided to assist the user. In some cases, there may be one or more tutorials available for each tool, and thus a vast library or database of tutorials 160 can exist. The tutorials 160, which are often prepared by expert photographers, typically describe the tool, how to use it, and the results that may be obtained. The tutorials 160 usually provide illustrations such as before and after images, allowing the user to visualize the types of improvements that can be achieved with the given tool.

The context-aware tutorial recommendation system 150 is configured to provide the user with a list of tutorials, ordered by relevance and effectiveness, according to some embodiments. The relevance is based on the similarity of the subject matter and objects in the user's photo to the subject matter and objects present in the example photos of the tutorials. The effectiveness is based on an estimate of the relative improvement in aesthetic qualities of the user's photo before and after application of the techniques of the tutorial.

For instance, in an example use case, the user opens an image 1100 of a garden of red flowers, as illustrated in FIG. 11. The context-aware tutorial recommendation system 150 recognizes the image subject matter as a nature scene and identifies image objects as flowers. As a result, the system provides a recommended tutorial 1110 directed to changing colors of flowers. The output image, after applying the techniques of the recommended tutorial, is shown as 1120 in which the flower colors have been changed from red to yellow. The context-aware tutorial recommendation system 150 is implemented with deep-learning, according to some such embodiments.

In more detail, according to an embodiment, a methodology implementing the techniques for context-aware tutorial recommendation, includes using a first neural network configured to determine the subject matter of a user provided image and using a second neural network configured to identify objects in the image. The method further includes selecting one or more proposed tutorials from a database of tutorials which has been indexed by tutorial subject matter and tutorial object content. The selection of proposed tutorials from the indexed database is based on a matching of the determined subject matter of the user provided image to the tutorial subject matter and a matching of the identified objects in the user provided image to the tutorial object content. The method further includes using a third neural network to calculate an effectiveness score associated with each of the proposed tutorials. The effectiveness score is based on an application of the techniques of the proposed tutorial to the user provided image to determine the aesthetic improvement that results. The method further includes sorting the proposed tutorials for recommendation to the user based on the effectiveness scores of each tutorial, so that the user can select the tutorial that is most likely to provide desired improvements. Thus, the user is presented with a number of tutorials that: (1) deal in general subject matter similar to the subject matter of the user's input image, (2) include specific objects similar to the objects of the user's input image, and (3) are ranked based on how well execution of that tutorial will positively impact the user's image.

Thus, the foregoing framework provides a system and methodology for providing context-aware tutorial recommendations. Numerous example configurations and variations will be apparent in light of this disclosure.

System Architecture

FIG. 2 is a block diagram of a context-aware tutorial recommendation system 150, configured in accordance with an embodiment of the present disclosure. The context-aware tutorial recommendation system 150 shown to include a subject matter determination neural network 220, an object identification neural network 230, a tutorial selection module 240, an effectiveness score calculation module 260, a sorting module 270, a heuristic filtering module 280, and a presentation module 290.

The subject matter determination neural network 220 is configured to determine a subject matter of a user provided image, and the object identification neural network 230 is configured to identify one or more objects in the user provided image. In some embodiments, the subject matter determination neural network 220 is a convolutional neural network (CNN) trained on a subject matter image training dataset, and the object identification neural network 230 is a CNN trained on an object image training dataset, as will be explained in greater detail below. In some embodiments, more than one subject matter may be identified with the user provided image.

The tutorial selection module 240 is configured to select one or more tutorials from a database of tutorials as proposed tutorials 250. The database of tutorials is indexed by tutorial subject matter and tutorial object content, as will be described in greater detail below. The selection of proposed tutorials 250 is based on a matching of the determined subject matter (or matters) of the user provided image to the tutorial subject matter and a matching of the identified objects in the user provided image to the tutorial object content.

The effectiveness score calculation module 260 employs a third neural network and is configured to calculate an effectiveness score associated with each of the proposed tutorials 250, according to an embodiment. The effectiveness score is derived from the results of application of the techniques of the proposed tutorial 250 to the user provided image, as will be explained in greater detail below with reference to FIG. 6.

The sorting module 270 is configured to sort the proposed tutorials for recommendation to the user based on the effectiveness scores so that, for example, the most effective tutorials are at the top of the list and will most likely provide the user with desirable results.

A heuristic filtering module 280 may be configured to filter the proposed tutorials (e.g., to prune the list) to remove tutorials based on empirically determined rules. For example, tutorials that have previously been presented to the user might be removed under the assumption that the user is already aware of those techniques and does not need to see them again.

The presentation module 290 is configured to generate and present the sorted proposed tutorials as a recommendation to the user, as will be described in greater detail below. Other suitable heuristic filtering rules may be employed, in light of the present disclosure.

Figure 3:
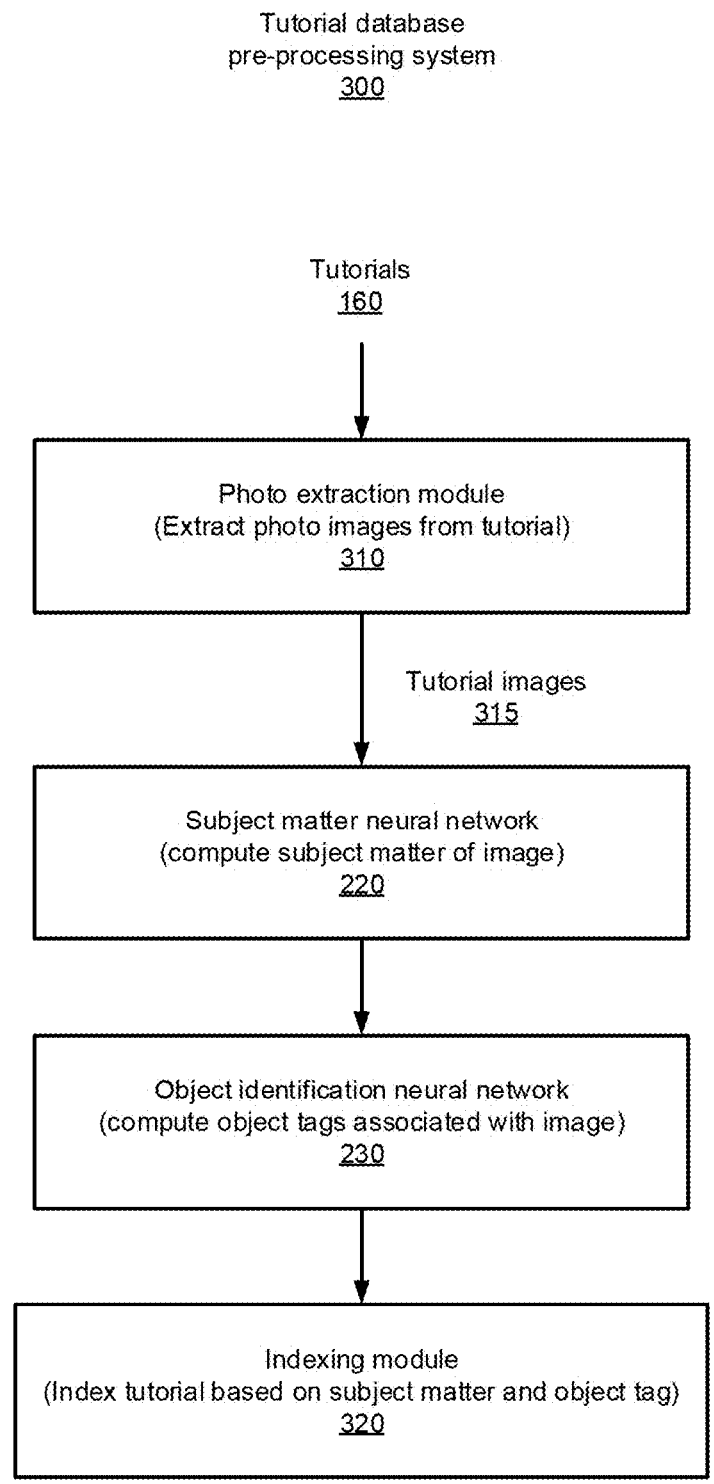
FIG. 3 is a block diagram of a tutorial database pre-processing system, configured in accordance with an embodiment of the present disclosure.

FIG. 3 is a block diagram of a tutorial database pre-processing system 300, configured in accordance with an embodiment of the present disclosure. The tutorial database pre-processing system 300 is configured to index the tutorials in the database to facilitate selection of appropriate tutorials from the database by the context-aware tutorial recommendation system 150. The indexing enables access to tutorials by subject matter associated with the images in the tutorials and by the objects included in those images. The tutorial database pre-processing system 300 is shown to include a photo extraction module 310, the subject matter determination neural network 220, the object identification neural network 230, and an indexing module 320. In some embodiments, the pre-processing system 300 can operate on each tutorial in the database, or on selected tutorials from the database.

The photo extraction module 310 is configured to search for and extract images 315 from a tutorial retrieved from the database for indexing. Most, if not all, tutorials will include sample images, for example to illustrate before and after versions of a photo that is processed according to the techniques of the tutorial.

As previously described, the subject matter determination neural network 220 is configured to determine a subject matter (or subject matters) of an image. In this case, however, the subject matter determination neural network 220 operates on the image (or images) 315 extracted from the tutorial. One or more subject matter labels or tags may then be associated with that image. Also, as previously described, the object identification neural network 230 is configured to identify objects in an image, in this case the image (or images) 315 extracted from the tutorial. An object identification label or tag may then be associated with that image, for each identified object.

The indexing module 320 is configured to index the tutorials in the database by subject matter and identified objects in the images of the tutorials. For example, a tutorial may be listed in an index under an entry for "nature scene" as the subject matter, and further indexed under an entry for "tiger" as an identified object in the image. If the tutorial image has been associated with multiple subject matters and/or multiple objects, then multiple indices will be generated. For example, an image might be indexed under both "nature scene" and "safari scene," in which case, tutorials directed to either of those subject matters may be recommended. Any suitable indexing scheme may be used, in light of the present disclosure, to provide a mechanism to efficiently search for and identify tutorials containing images associated with a given subject matter and given objects. For example, a mapping may be established between the identified subject matter and object labels and an index value that points to a relevant and effective tutorial.

In some embodiments, the tutorial database pre-processing system 300 may be employed on the tutorial database during initial construction of the database, and/or periodically thereafter, as new tutorials are added.

Figure 4:
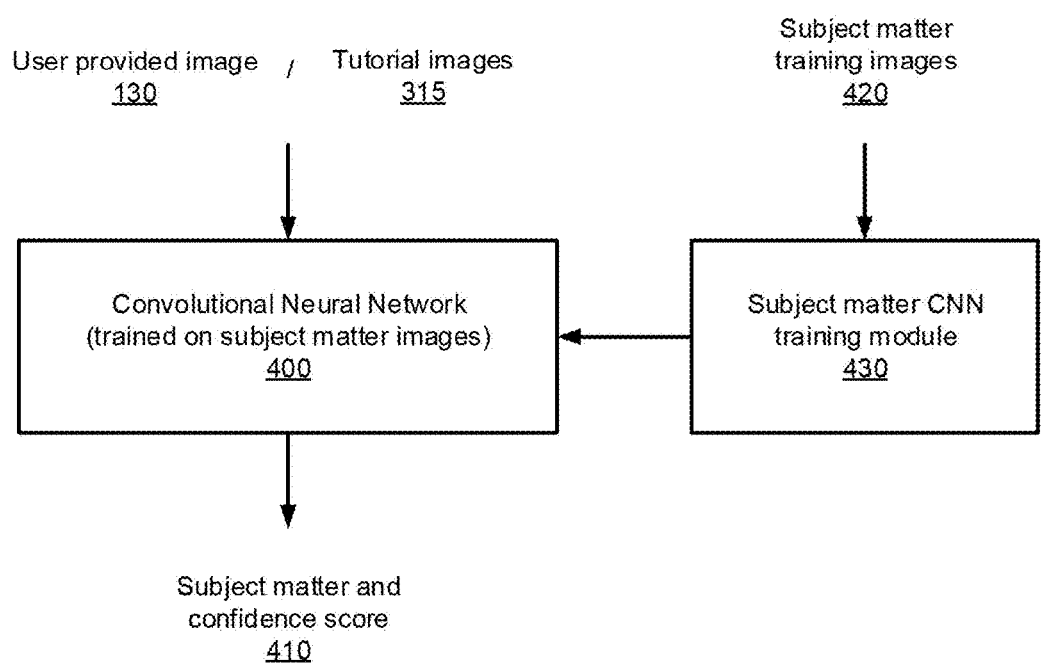
FIG. 4 is a block diagram of a subject matter determination neural network, configured in accordance with an embodiment of the present disclosure.

FIG. 4 is a block diagram of the subject matter determination neural network 220, configured in accordance with an embodiment of the present disclosure. The subject matter determination neural network 220 is a deep-learning based multi-class classification model configured to determine a subject matter of an image. The image may be a user provided image 130, for example during operation of the context-aware tutorial recommendation system 150, or an image 315 extracted from a tutorial, for example during operation of the tutorial database pre-processing system 300. In some embodiments, the subject matter determination neural network 220 is a convolutional neural network (CNN) 400 configured to analyze the image and generate labels or tags indicating the estimated subject matter along with a confidence score 410. The CNN comprises an input layer, an output layer, and any number of hidden layers between the input and output layers. The hidden layers are generally configured to perform convolution or cross-correlation operations on the outputs of a previous layer to generate inputs to a next layer, using weighting factors that are generated during training of the CNN. Additionally, some layers may also include activation functions to perform thresholding of the data and pooling functions to reduce the dimensionality of the data from one layer to the next.

In some embodiments, a confidence score 410 below a selected threshold may be used to reject that estimated subject matter. The CNN 400 may be trained, for example, by subject matter CNN training module 430, using any known training techniques and subject matter training images 420, from an annotated subject matter image training dataset, or by any suitable means in light of the present disclosure.

Figure 5:
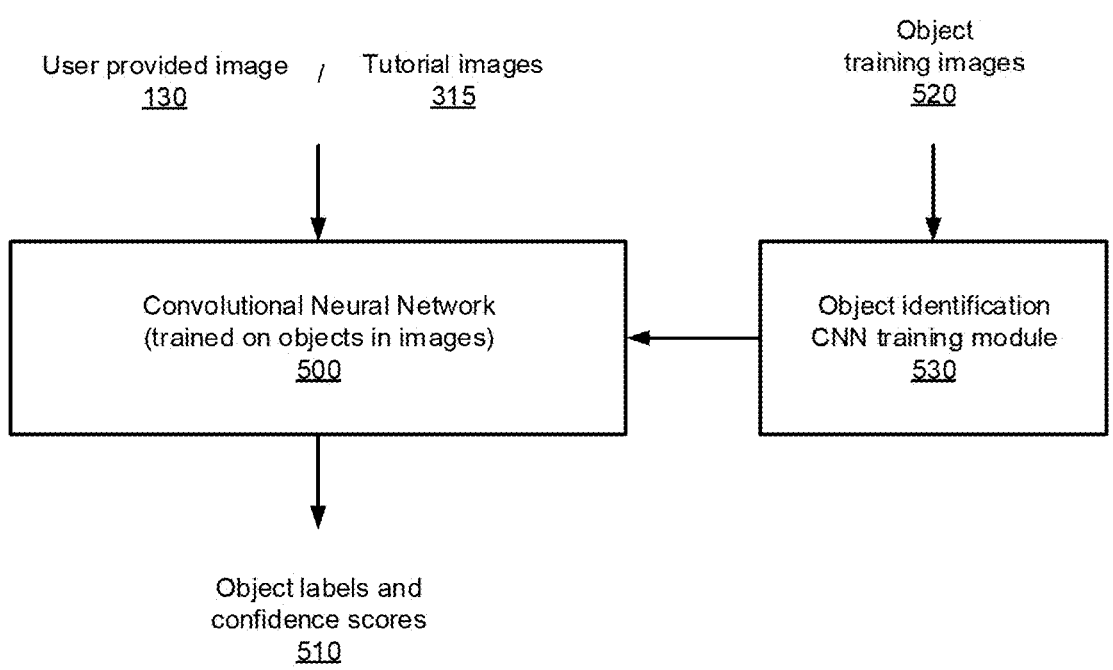
FIG. 5 is a block diagram of an object identification neural network, configured in accordance with an embodiment of the present disclosure.

FIG. 5 is a block diagram of the object identification neural network 230, configured in accordance with an embodiment of the present disclosure. The object identification neural network 230 is configured to identify objects in an image. The image may be a user provided image 130, for example during operation of the context-aware tutorial recommendation system 150, or an image 315 extracted from a tutorial, for example during operation of the tutorial database pre-processing system 300. In some embodiments, the object identification neural network 230 is a convolutional neural network (CNN) 500 configured to analyze the image and generate a label or tag (along with a confidence score) 510 for each identified object in the image. In some embodiments, a confidence score 510 below a selected threshold may be used to reject that identified object. The CNN 500 may be trained, for example, by object identification CNN training module 530, using any known training techniques and object training images 520, from an annotated object image training dataset, or by any suitable means in light of the present disclosure.

Figure 6:
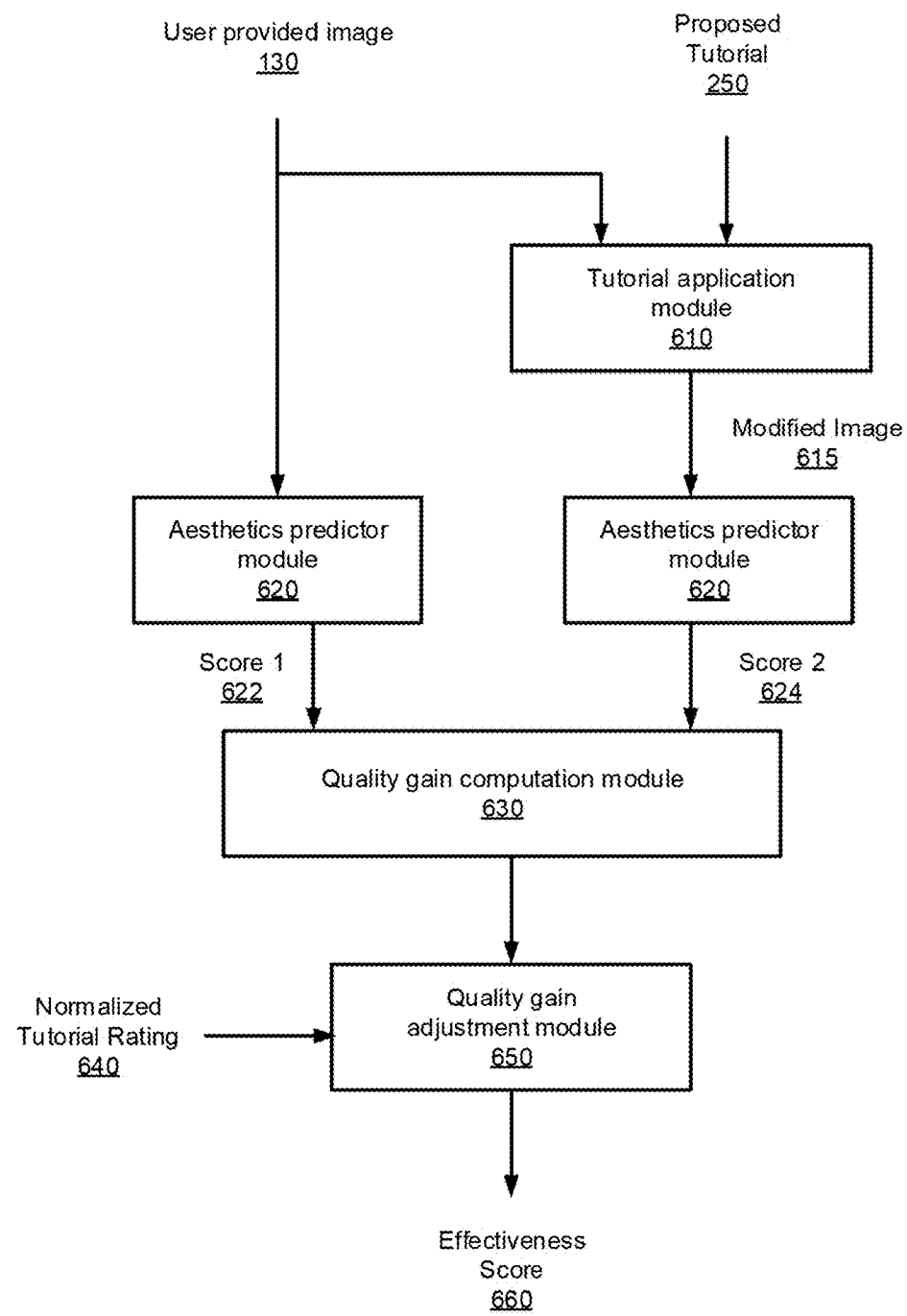
FIG. 6 is a block diagram of an effectiveness score calculation module, configured in accordance with an embodiment of the present disclosure.

FIG. 6 is a block diagram of the effectiveness score calculation module 260, configured in accordance with an embodiment of the present disclosure. The effectiveness score calculation module 260 is shown to include a tutorial application module 610, an aesthetics predictor module 620, a quality gain computational module 630, and a quality gain adjustment module 650.

The tutorial application module 610 is configured to apply techniques associated with the proposed tutorial 250 to the user provided image 130 to generate a modified image 615.

The aesthetics predictor module 620 is configured to apply a third neural network to the user provided image 130 and to the modified image 615. In some embodiments, the third neural network may be a deep-learning based image aesthetics predictor model implemented as a convolutional neural network, or any suitable network in light of the present disclosure. The third neural network is configured to generate aesthetics scores 622 and 624 based on each image, using any known training techniques and an annotated training dataset, in light of the present disclosure. In some embodiments, aesthetics scores may include a weighted combination of one or more of the following factors: interesting content, balancing, harmony, content, depth of field, lighting, object emphasis, repetition, adherence to rule of thirds, symmetry, and vividness.

The quality gain computational module 630 is configured to compute a quality gain based on a relative percentage change between the first aesthetics score 622 (based on the original image) and the second aesthetics score 624 (based on the modified image). In some embodiments, the quality gain (QG) may be computed from the aesthetics scores (AS) according to the following formula:

QG=(AS of modified image−AS of original image)/
AS of original image

The quality gain adjustment module 650 is configured to compute the effectiveness score 660 based on the product of the quality gain and on a normalized rating 640 of the proposed tutorial to incorporate tutorial feedback into the effectiveness score. For example, if previous feedback from users of the tutorial was not favorable (e.g., the normalized rating 640 is relatively low), then that fact will have an impact and reduce the effectiveness score. In some embodiments, the effectiveness score (ES) may be computed according to the following formula:

ES=QG*Normalized Tutorial Rating

In some embodiments, if the effectiveness score is less than a selected threshold, that tutorial may be discarded from the proposed recommendations.

Figure 7:
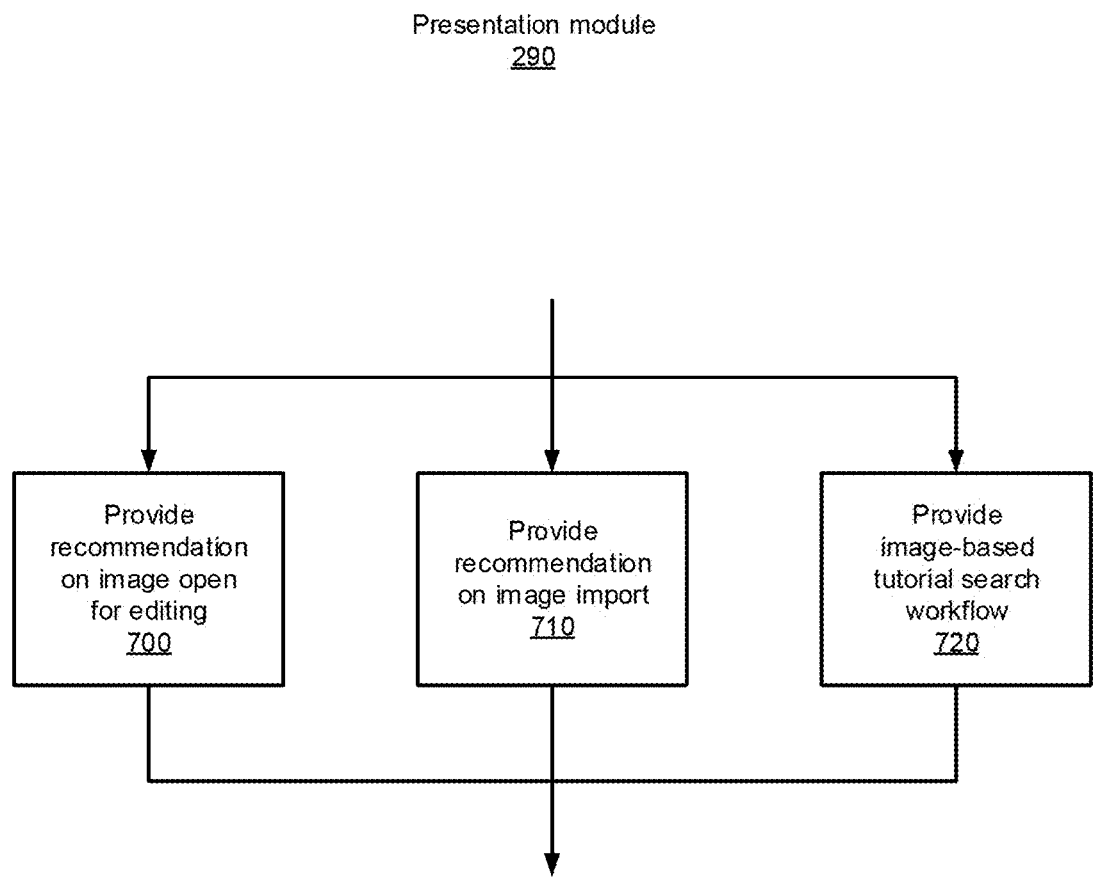
FIG. 7 is a block diagram of a presentation module, configured in accordance with an embodiment of the present disclosure.

FIG. 7 is a block diagram of the presentation module 290, configured in accordance with an embodiment of the present disclosure. The presentation module 290 is configured to generate and present the sorted proposed tutorials as a recommendation to the user in response to the opening 700 of the user provided image in a photo editing application, or the importing 710 of the user provided image to the photo editing application. Additionally, in some embodiments, the presentation module may be configured to enable the photo editing application to provide an image-based tutorial search workflow 720. A tutorial search workflow may include receiving, by the photo editing application, a tutorial-related help request from the user that includes a user provided image. For example, a user may request guidance on how to improve contrast, and in particular image.

Methodology

Figure 8:
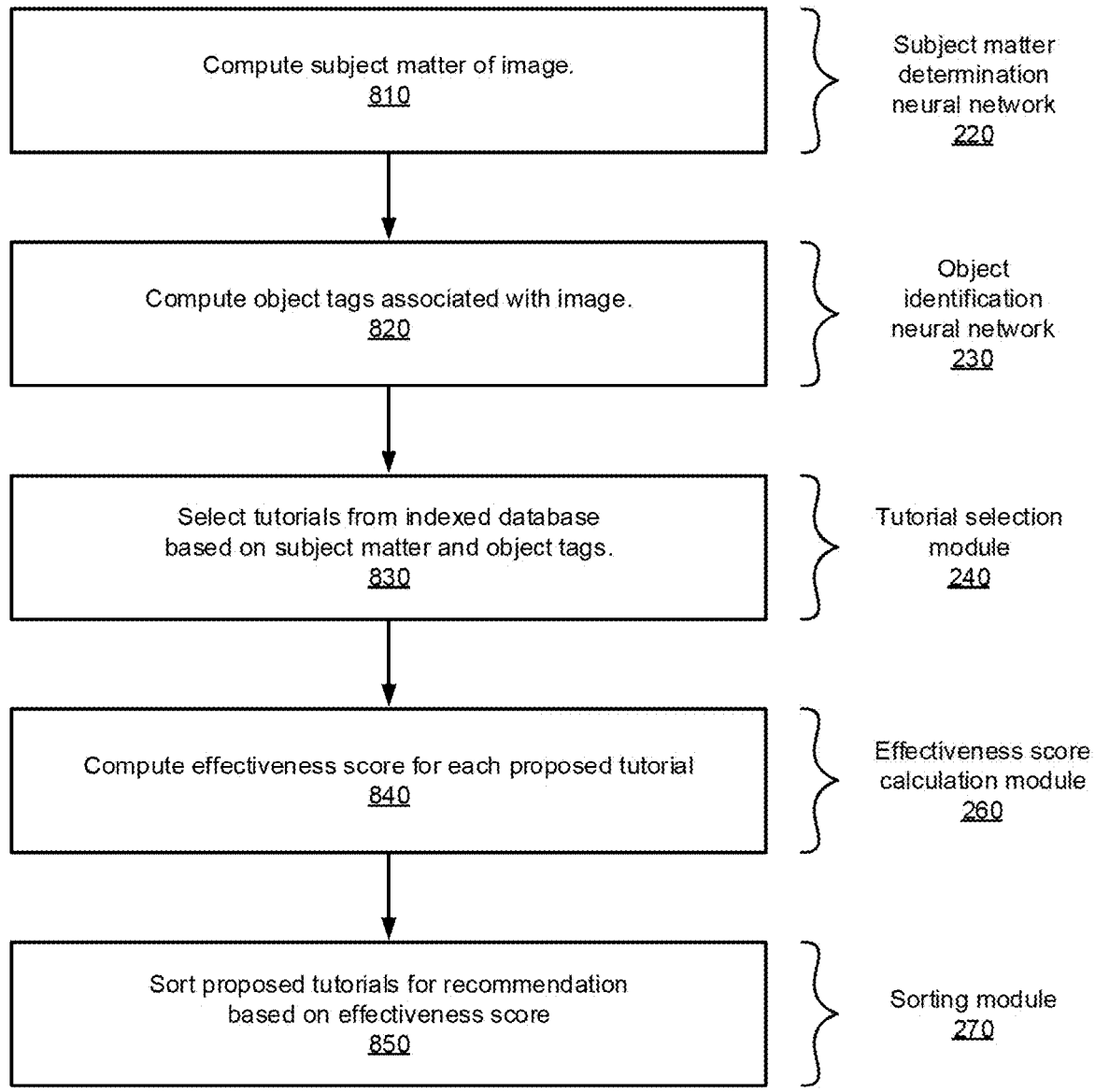
FIG. 8 is a flowchart illustrating a method for generating context-aware tutorial recommendations, in accordance with an embodiment of the present disclosure.

FIG. 8 is a flowchart 800 illustrating a method for generating context-aware tutorial recommendations, in accordance with an embodiment of the present disclosure. As can be seen, the method is described with reference to the configuration of context-aware tutorial recommendation system 150 of FIG. 2, and the components thereof from FIGS. 3-7. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 810, by using a first neural network configured to determine a subject matter of a user provided image. In some embodiments, the first neural network is a convolutional neural network (CNN) trained on a subject matter image training dataset.

The method continues, at operation 820, by using a second neural network configured to identify objects in the user provided image. In some embodiments, the second neural network is a CNN trained on an object image training dataset.

At operation 830, one or more proposed tutorials are selected from a database of tutorials. The database of tutorials is indexed by tutorial subject matter and tutorial object content, and the selection is based on a matching of the determined subject matter to the tutorial subject matter and a matching of the identified objects to the tutorial object content.

At operation 840, an effectiveness score is calculated for each of the proposed tutorials. The effectiveness score is based on application of the proposed tutorial to the user provided image. In some embodiments, the techniques associated with the proposed tutorial are applied to the user provided image to generate a modified image, and aesthetics scores are generated for the original, unmodified images, for example by a third neural network. The effectiveness score may then be calculated from the relative percentage increase, or change, between the aesthetics scores. The effectiveness score may also be weighted by a rating of the proposed tutorial.

At operation 850, the proposed tutorials are sorted for recommendation to the user, based on the effectiveness scores. This tutorial recommendations may be made in response to the opening of the user provided image in a photo editing application, the importing of the user provided image to the photo editing application, and/or a tutorial-related help request from the user of the photo editing application In some embodiments, additional operations are performed. For example, in one embodiment, the tutorial subject matter is generated by application of the first neural network to one or more images included in the database of tutorials and the tutorial object content is generated by application of the second neural network to the one or more images included in the database of tutorials. In some embodiments, the user provided image is a frame of a video sequence.

Example Platform

Figure 9:
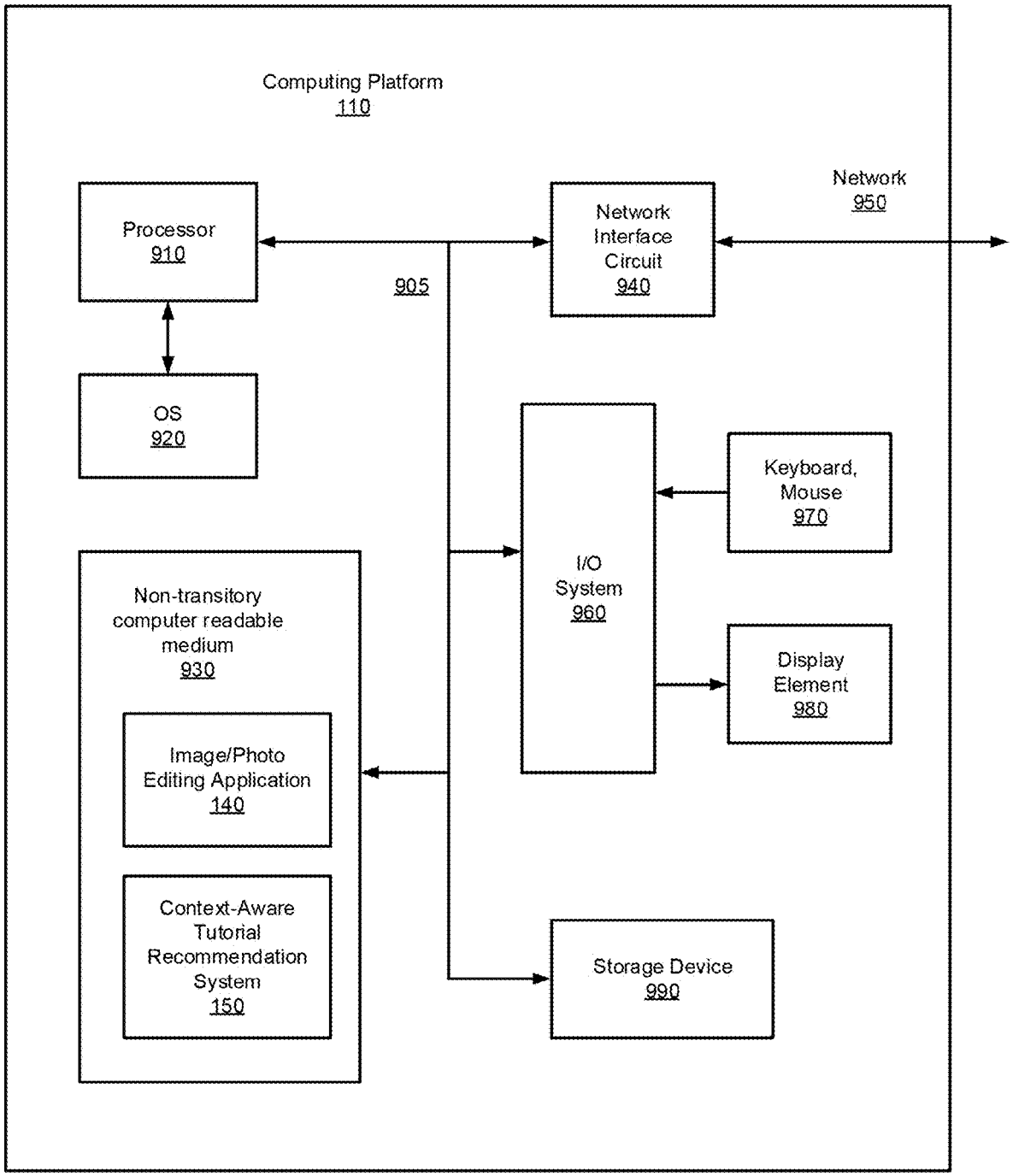
FIG. 9 is a block diagram schematically illustrating a computing platform configured to perform any of the techniques as variously described in this disclosure, configured in accordance with an embodiment of the present disclosure.

FIG. 9 is a block diagram schematically illustrating a computing platform 110 configured to perform any of the techniques as variously described in this disclosure, configured in accordance with an embodiment of the present disclosure. For example, in some embodiments, the context-aware tutorial recommendation system 150 of FIG. 2, or any portions thereof as illustrated in FIGS. 3-7, and the methodologies of FIG. 8, or any portions thereof, are implemented in the computing platform 110. In some embodiments, the computing platform 110 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing device that has sufficient processor power and memory capacity to perform the operations described in this disclosure. In some embodiments, a distributed computational system is provided comprising a plurality of such computing devices.

The computing platform 110 includes one or more storage devices 990 and/or non-transitory computer-readable media 930 having encoded thereon one or more computer-executable instructions or software for implementing techniques as variously described in this disclosure. In some embodiments, the storage devices 990 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 990 includes other types of memory as well, or combinations thereof. In one embodiment, the storage device 990 is provided on the computing platform 110. In another embodiment, the storage device 990 is provided separately or remotely from the computing platform 110. The non-transitory computer-readable media 930 include, but are not limited to, one or more types of hardware memory, non-transitory tangible media (for example, one or more magnetic storage disks, one or more optical disks, one or more USB flash drives), and the like. In some embodiments, the non-transitory computer-readable media 930 included in the computing platform 110 store computer-readable and computer-executable instructions or software for implementing various embodiments. In one embodiment, the computer-readable media 930 are provided on the computing platform 110. In another embodiment, the computer-readable media 930 are provided separately or remotely from the computing platform 110.

The computing platform 110 also includes at least one processor 910 for executing computer-readable and computer-executable instructions or software stored in the storage device 990 and/or non-transitory computer-readable media 930 and other programs for controlling system hardware. In some embodiments, virtualization is employed in the computing platform 110 so that infrastructure and resources in the computing platform 110 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 905 is also provided to allow for communication between the various components listed above and/or other components not shown. Computing platform 110 can be coupled to a network 950 (e.g., a local or wide area network such as the internet), through network interface circuit 940 to allow for communications with other computing devices, platforms, resources, clients, and Internet of Things (IoT) devices.

In some embodiments, a user interacts with the computing platform 110 through an input/output system 960 that interfaces with devices such as a keyboard and mouse 970 and/or a display element (screen/monitor) 980. The keyboard and mouse may be configured to provide a user interface to accept user input and guidance, for example to select images, video frames, photos, and/or other data for processing by the system, and to otherwise control the tutorial recommendation process. The display element may be configured, for example, to display the results of processing using the disclosed techniques. In some embodiments, the computing platform 110 includes other I/O devices (not shown) for receiving input from a user, for example, a pointing device or a touchpad, etc., or any suitable user interface. In some embodiments, the computing platform 110 includes other suitable conventional I/O peripherals. The computing platform 110 can include and/or be operatively coupled to various suitable devices for performing one or more of the aspects as variously described in this disclosure.

In some embodiments, the computing platform 110 runs an operating system (OS) 920, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 110 and performing the operations described in this disclosure. In one embodiment, the operating system runs on one or more cloud machine instances.

As will be appreciated in light of this disclosure, the various modules and components of the system, as shown in FIGS. 1 and 7-10, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 110, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Example Images

FIG. 10 illustrates examples of subject matter, object, tutorial images, and aesthetic improvements, in accordance with an embodiment of the present disclosure. For example, image 1000 as an animal or wildlife subject matter, with unidentified object being a bird. The context-aware tutorial recommendation system 150 may provide a recommendation of tutorial 1010, dealing with techniques for boosting the color of the bird photograph. An output image 1030 is also shown to illustrate the results of applying the techniques of the recommended tutorial. Additionally, example aesthetic factors 1020 and 1040 are listed for the input image and the output image, respectively. As can be seen, some factors are improved and some factors are not improved, but the overall combined or global score is improved.

FIG. 11 illustrates examples of image improvements based on application of recommended tutorials, in accordance with an embodiment of the present disclosure. Input image 1100 shows a field of red flowers, the recommended tutorial 1110 provides techniques for changing colors of flowers, and the output image 1120 (after application of the techniques of the tutorial 1110) shows that the field of flowers have been changed in color from red to yellow.

Input image 1130 shows buildings of a city skyline, the recommended tutorial 1140 provides techniques for reducing haze in a skyline photo, and the output image 1150 (after application of the techniques of the tutorial 1140) shows an overall improvement in the clarity of the photo.

Further Example Embodiments

Numerous example embodiments will be apparent, and features described herein can be combined in any number of configurations.

Example 1 is a method for proposing recommended tutorials, the method comprising: determining, by a processor-based system, a subject matter of a user provided image by using a first neural network; identifying, by the processor-based system, objects in the user provided image by using a second neural network; matching, by the processor-based system, of the determined subject matter to a subject matter of the tutorial and of the identified objects to an object content of the tutorial, to select one or more proposed tutorials from a database of tutorials, wherein the database of tutorials is indexed by the tutorial subject matter and the tutorial object content; calculating, by the processor-based system, an effectiveness score associated with each of the proposed tutorials, the effectiveness score based on application of the proposed tutorial to the user provided image; and sorting, by the processor-based system, the proposed tutorials for recommendation to the user, the sorting based on the effectiveness scores.

Example 2 includes the subject matter of Example 1, wherein the first neural network is a convolutional neural network (CNN) trained on a subject matter image training dataset, and the second neural network is a CNN trained on an object image training dataset.

Example 3 includes the subject matter of Examples 1 or 2, wherein the calculation of the effectiveness score further comprises: generating a first aesthetics score based on the user provided image by applying a third neural network to the user provided image; generating a modified image by applying techniques associated with the proposed tutorial to the user provided image; generating a second aesthetics score based on the modified image by applying the third neural network to the modified image; computing a quality gain based on a relative percentage change between the first aesthetics score and the second aesthetics score; and computing the effectiveness score based on a product of the quality gain and a rating of the proposed tutorial.

Example 4 includes the subject matter of any of Examples 1-3, further comprising removing tutorials that have previously been presented to the user by filtering the proposed tutorials.

Example 5 includes the subject matter of any of Examples 1-4, wherein the tutorial subject matter is generated by application of the first neural network to one or more images included in the database of tutorials and the tutorial object content is generated by application of the second neural network to the one or more images included in the database of tutorials.

Example 6 includes the subject matter of any of Examples 1-5, further comprising generating and presenting the sorted proposed tutorials as a recommendation to the user in response to at least one of: opening of the user provided image in a photo editing application, importing of the user provided image to the photo editing application, and receiving, by the photo editing application, a tutorial-related help request from the user.

Example 7 includes the subject matter of any of Examples 1-6, wherein the user provided image is a frame of a video sequence.

Example 8 is a system for generating tutorial recommendations, the system comprising: one or more processors configured to utilize a first neural network configured to determine a subject matter of a user provided image; the one or more processors further configured to utilize a second neural network configured to identify objects in the user provided image; the one or more processors further configured to control and/or execute a tutorial selection module to select one or more proposed tutorials from a database of tutorials, wherein the database of tutorials is indexed by tutorial subject matter and tutorial object content, and the selecting is based on a matching of the determined subject matter to the tutorial subject matter and a matching of the identified objects to the tutorial object content; the one or more processors further configured to control and/or execute an effectiveness score calculation module to calculate an effectiveness score associated with each of the proposed tutorials, the effectiveness score based on application of the proposed tutorial to the user provided image; and the one or more processors further configured to control and/or execute a sorting module to sort the proposed tutorials for recommendation to the user, the sorting based on the effectiveness scores.

Example 9 includes the subject matter of Example 8, wherein the first neural network is a convolutional neural network (CNN) trained on a subject matter image training dataset, and the second neural network is a CNN trained on an object image training dataset.

Example 10 includes the subject matter of Examples 8 or 9, wherein the calculation of the effectiveness score further comprises: applying a third neural network to the user provided image, the third neural network configured to generate a first aesthetics score based on the user provided image; applying techniques associated with the proposed tutorial to the user provided image to generate a modified image; applying the third neural network to the modified image to generate a second aesthetics score based on the modified image; computing a quality gain based on a relative percentage change between the first aesthetics score and the second aesthetics score; and computing the effectiveness score based on a product of the quality gain and a rating of the proposed tutorial.

Example 11 includes the subject matter of any of Examples 8-10, further comprising a heuristic filtering module, controllable and/or executable by the one or more processors, and configured to filter the proposed tutorials to remove tutorials that have previously been presented to the user.

Example 12 includes the subject matter of any of Examples 8-11, wherein the tutorial subject matter is generated by application of the first neural network to one or more images included in the database of tutorials and the tutorial object content is generated by application of the second neural network to the one or more images included in the database of tutorials.

Example 13 includes the subject matter of any of Examples 8-12, further comprising a presentation module, controllable and/or executable by the one or more processors, and configured to generate and present the sorted proposed tutorials as a recommendation to the user in response to at least one of: opening of the user provided image in a photo editing application, importing of the user provided image to the photo editing application, and receiving, by the photo editing application, a tutorial-related help request from the user.

Example 14 is a computer program product including one or more non-transitory machine-readable mediums encoded with instructions that when executed by one or more processors cause a process to be carried out for tutorial recommendation, the process comprising: determining a subject matter of a user provided image by using a first neural network; identifying objects in the user provided image by using a second neural network; matching of the determined subject matter to a subject matter of the tutorial and of the identified objects to an object content of the tutorial, to select one or more proposed tutorials from a database of tutorials, wherein the database of tutorials is indexed by the tutorial subject matter and the tutorial object content; calculating an effectiveness score associated with each of the proposed tutorials, the effectiveness score based on application of the proposed tutorial to the user provided image; and sorting the proposed tutorials for recommendation to the user, the sorting based on the effectiveness scores.

Example 15 includes the subject matter of Example 14, wherein the first neural network is a convolutional neural network (CNN) trained on a subject matter image training dataset, and the second neural network is a CNN trained on an object image training dataset.

Example 16 includes the subject matter of Examples 14 or 15, wherein the calculation of the effectiveness score further comprises: generating a first aesthetics score based on the user provided image by applying a third neural network to the user provided image; generating a modified image by applying techniques associated with the proposed tutorial to the user provided image; generating a second aesthetics score based on the modified image by applying the third neural network to the modified image; computing a quality gain based on a relative percentage change between the first aesthetics score and the second aesthetics score; and computing the effectiveness score based on a product of the quality gain and a rating of the proposed tutorial.

Example 17 includes the subject matter of any of Examples 14-16, further comprising removing tutorials that have previously been presented to the user by filtering the proposed tutorials.

Example 18 includes the subject matter of any of Examples 14-17, wherein the tutorial subject matter is generated by application of the first neural network to one or more images included in the database of tutorials and the tutorial object content is generated by application of the second neural network to the one or more images included in the database of tutorials.

Example 19 includes the subject matter of any of Examples 14-18, further comprising generating and presenting the sorted proposed tutorials as a recommendation to the user in response to at least one of: opening of the user provided image in a photo editing application, importing of the user provided image to the photo editing application, and receiving, by the photo editing application, a tutorial-related help request from the user.

Example 20 includes the subject matter of any of Examples 14-19, wherein the user provided image is a frame of a video sequence.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for proposing recommended tutorials, the method comprising:
   determining, by a processor-based system, a subject matter of a user provided image by using a first neural network, wherein the user provided image is provided by a user;
   identifying, by the processor-based system, objects in the user provided image by using a second neural network;
   matching, by the processor-based system, the determined subject matter to a tutorial subject matter and the identified objects to a tutorial object content, to select a plurality of proposed tutorials from a database of tutorials, wherein the database of tutorials is indexed by subject matter and object content;
   calculating, by the processor-based system, an effectiveness score associated with each of the proposed tutorials, the effectiveness score based on application of the proposed tutorial to the user provided image; and
   sorting, by the processor-based system, the proposed tutorials for recommendation to the user, the sorting based on the effectiveness scores.

2. The method of claim 1, wherein the first neural network is a convolutional neural network (CNN) trained on a subject matter image training dataset, and the second neural network is a CNN trained on an object image training dataset.

3. The method of claim 1, wherein calculating the effectiveness score further comprises:
   generating a first aesthetics score based on the user provided image by applying a third neural network to the user provided image;
   generating a modified image by applying techniques associated with the proposed tutorial to the user provided image;
   generating a second aesthetics score based on the modified image by applying the third neural network to the modified image;
   computing a quality gain based on a relative percentage change between the first aesthetics score and the second aesthetics score; and
   computing the effectiveness score based on a product of the quality gain and a rating of the proposed tutorial.

4. The method of claim 1, further comprising removing tutorials that have previously been presented to the user by filtering the proposed tutorials.

5. The method of claim 1, wherein the tutorial subject matter is generated by application of the first neural network to one or more images included in the database of tutorials and the tutorial object content is generated by application of the second neural network to the one or more images included in the database of tutorials.

6. The method of claim 1, further comprising generating and presenting the sorted proposed tutorials as a recommendation to the user in response to at least one of: opening of the user provided image in a photo editing application, importing of the user provided image to the photo editing application, and receiving, by the photo editing application, a tutorial-related help request from the user.

7. The method of claim 1, wherein the user provided image is a frame of a video sequence.

8. A system for generating tutorial recommendations, the system comprising:
   one or more processors configured to utilize a first neural network configured to determine a subject matter of a user provided image;
   the one or more processors further configured to utilize a second neural network configured to identify objects in the user provided image;
   the one or more processors further configured to control and/or execute a tutorial selection module to select one or more proposed tutorials from a database of tutorials, wherein the database of tutorials is indexed by tutorial subject matter and tutorial object content, and the selecting is based on a matching of the determined subject matter to the tutorial subject matter and a matching of the identified objects to the tutorial object content;
   the one or more processors further configured to control and/or execute an effectiveness score calculation module to calculate an effectiveness score associated with each of the proposed tutorials, the effectiveness score based on application of the proposed tutorial to the user provided image; and the one or more processors further configured to control and/or execute a sorting module to sort the proposed tutorials for recommendation to the user, the sorting based on the effectiveness scores.

9. The system of claim 8, wherein the first neural network is a convolutional neural network (CNN) trained on a subject matter image training dataset, and the second neural network is a CNN trained on an object image training dataset.

10. The system of claim 8, wherein the calculation of the effectiveness score further comprises:
  applying a third neural network to the user provided image, the third neural network configured to generate a first aesthetics score based on the user provided image;
  applying techniques associated with the proposed tutorial to the user provided image to generate a modified image;
  applying the third neural network to the modified image to generate a second aesthetics score based on the modified image;
  computing a quality gain based on a relative percentage change between the first aesthetics score and the second aesthetics score; and
  computing the effectiveness score based on a product of the quality gain and a rating of the proposed tutorial.

11. The system of claim 8, further comprising a heuristic filtering module, controllable and/or executable by the one or more processors, and configured to filter the proposed tutorials to remove tutorials that have previously been presented to the user.

12. The system of claim 8, wherein the tutorial subject matter is generated by application of the first neural network to one or more images included in the database of tutorials and the tutorial object content is generated by application of the second neural network to the one or more images included in the database of tutorials.

13. The system of claim 8, further comprising a presentation module, controllable and/or executable by the one or more processors, and configured to generate and present the sorted proposed tutorials as a recommendation to the user in response to at least one of: opening of the user provided image in a photo editing application, importing of the user provided image to the photo editing application, and receiving, by the photo editing application, a tutorial-related help request from the user.

14. A computer program product including one or more non-transitory machine-readable mediums encoded with instructions that when executed by one or more processors cause a process to be carried out for tutorial recommendation, the process comprising:
  determining a subject matter of a user provided image by using a first neural network, wherein the user provided image is provided by a user;
  identifying objects in the user provided image by using a second neural network;
  matching the determined subject matter to a tutorial subject matter and the identified objects to tutorial object content, to select a plurality of proposed tutorials from a database of tutorials, wherein the database of tutorials is indexed by subject matter and object content;
  calculating an effectiveness score associated with each of the proposed tutorials, the effectiveness score based on application of the proposed tutorial to the user provided image; and
  sorting the proposed tutorials for recommendation to the user, the sorting based on the effectiveness scores.

15. The computer program product of claim 14, wherein the first neural network is a convolutional neural network (CNN) trained on a subject matter image training dataset, and the second neural network is a CNN trained on an object image training dataset.

16. The computer program product of claim 14, wherein calculating the effectiveness score further comprises:
  generating a first aesthetics score based on the user provided image by applying a third neural network to the user provided image;
  generating a modified image by applying techniques associated with the proposed tutorial to the user provided image;
  generating a second aesthetics score based on the modified image by applying the third neural network to the modified image;
  computing a quality gain based on a relative percentage change between the first aesthetics score and the second aesthetics score; and
  computing the effectiveness score based on a product of the quality gain and a rating of the proposed tutorial.

17. The computer program product of claim 14, further comprising removing tutorials that have previously been presented to the user by filtering the proposed tutorials.

18. The computer program product of claim 14, wherein the tutorial subject matter is generated by application of the first neural network to one or more images included in the database of tutorials and the tutorial object content is generated by application of the second neural network to the one or more images included in the database of tutorials.

19. The computer program product of claim 14, further comprising generating and presenting the sorted proposed tutorials as a recommendation to the user in response to at least one of: opening of the user provided image in a photo editing application, importing of the user provided image to the photo editing application, and receiving, by the photo editing application, a tutorial-related help request from the user.

20. The computer program product of claim 14, wherein the user provided image is a frame of a video sequence.

* * * * *